Dec. 26, 1939.  F. MILLIKEN  2,184,462
BULKHEAD, SEA WALL, AND SIMILAR STRUCTURE
Filed Jan. 5, 1939
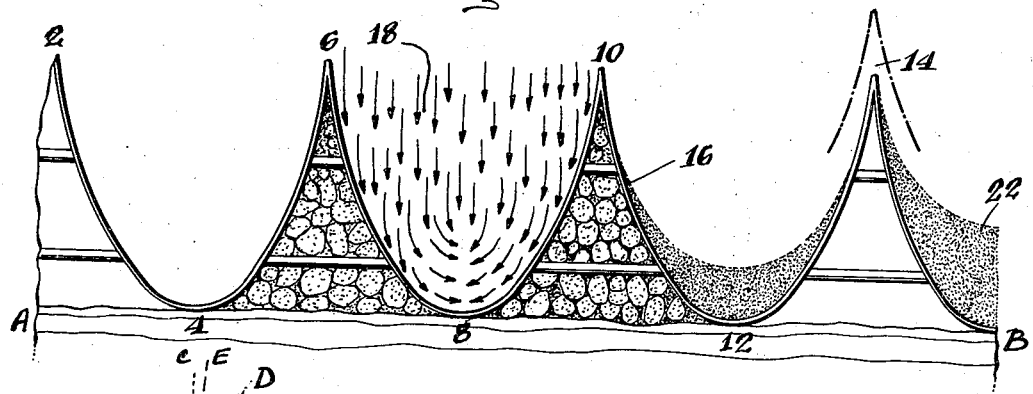
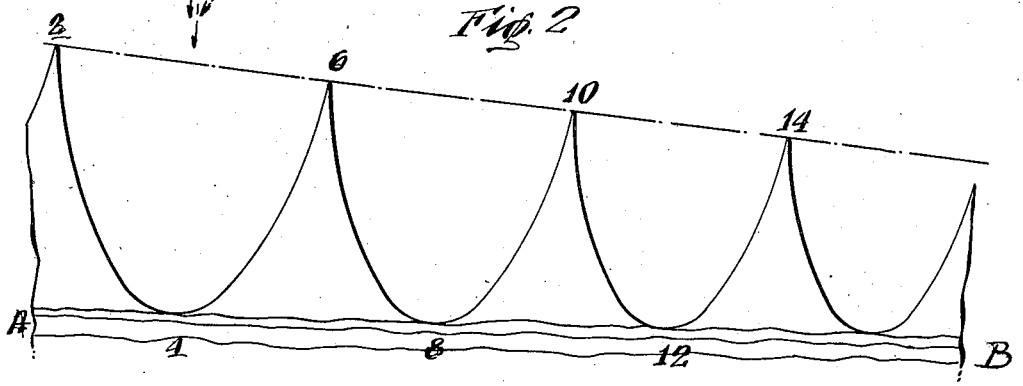
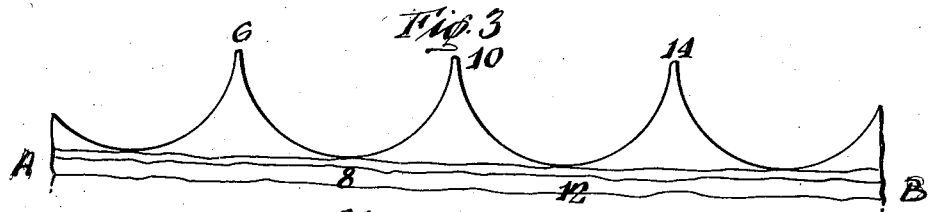
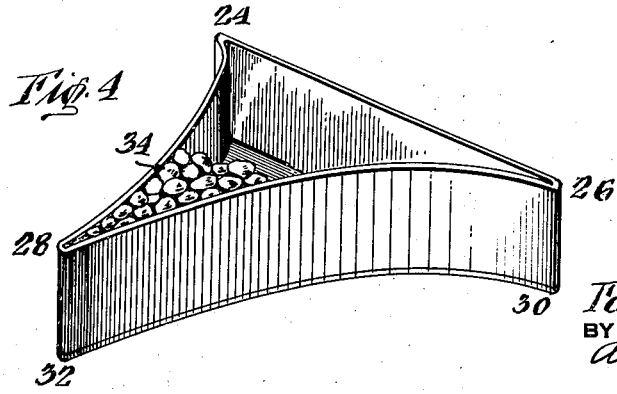
INVENTOR
Foster Milliken
BY
Alan M. Mann
ATTORNEY Patented Dec. 26, 1939

2,184,462

UNITED STATES PATENT OFFICE 2,184,462

BULKHEAD, SEA WALL, AND SIMILAR STRUCTURES

Foster Milliken, New York, N. Y.

Application January 5, 1939, Serial No. 249,362

2 Claims. (Cl. 61—4)

This invention relates to structures for counteracting the destructive effect of wind, wave, and current action along shore fronts and inland.

In order to make some of the objects of this invention clear, I would state the following:

1. Instead of depending on man-made construction to combat nature, I believe a better and much cheaper method is to make nature combat itself.

2. Nature moves in curves, not in straight lines. I believe in letting nature have its own way and not attempting to combat it.

3. Liquids and gases, when in motion, will carry a considerable amount of solids, but when at rest, these solids will be deposited by gravity.

4. When liquids or gases in motion meet a curved surface, their velocity will increase.

To forestall drastic changes in topography resulting from wind, waves or current action, it is frequently necessary to erect structures to retard or prevent such action. Along shore fronts, for example, it is a common practice to rely upon bulkheads or sea walls as a barrier. Such bulkheads and sea walls are usually relatively massive structures built to withstand a direct impact. This type of structure prevents damage to the land lying back of the bulkhead, but it cannot prevent damage to the land or beach lying in front of it, nor can it prevent scouring around the base of the bulkhead and consequent weakening of the foundation of the structure.

I have discovered that I can build a structure which not only prevents wind, wave or current action from washing away land lying in front or back of the structure, but I find that a structure built in accordance with my invention assists in building up the land or beach lying in front of the bulkhead by causing solids carried by wave or current action to be deposited. In accordance with my invention, I prevent the direct impact against the bulkhead or sea wall by modifying and reducing the intensity of the wave and current action as these forces strike the bulkhead; and I avoid consequent scouring around the base of the bulkhead.

Broadly speaking, my invention consists of a bulkhead or sea wall having its outer face formed into a series of recesses with curved sides. The walls of each recess are curved inwardly on a horizontal plane and each recess is connected with adjoining recesses by common apices.

The function of a series of such recesses in a sea wall is to break up the forces acting against the structure into a plurality of separately acting units; and the function of the inwardly curved sides of such recesses is to trap and deflect these forces so that, within each recess, these forces are again divided and led from opposite sides of the recess along the curved lines to a central point where they meet head-on. Forces trapped within each such recess act against each other and a direct impact against the bulkhead is in this way avoided. For example, when a wave strikes the apices of the bulkhead, part of the body of water is led inwardly along one side of the recess and part is led inwardly along the opposite side. The divided forces with increased velocity will meet head-on at the innermost part of the recess. The direct impact to the structure is thereby avoided.

When a body of water in motion enters such a recess, the velocity of that part of the wave adjacent to the sides of the recess increases as the body of water rushes inwardly along the inwardly curved sides of the recess. In this way, a column of water is built up which has a velocity in excess of the velocity of the water entering the recess in a direct line, thus forming a cushion which receives the impact of that part of the wave which strikes in a direct line. By creating this action within each recess, I prevent a direct impact on the bulkhead.

In addition to these factors, I cause the body of water within the recess momentarily to tend to come to rest. Water in motion carries with it a certain amount of solids. By bringing the body of water within the recess momentarily to rest, I am able to precipitate the solids carried by the water. When a wave breakes on a beach, for example, the resulting undertow carries solids out to sea. When the wave breaks against a structure comprising a series of recesses with inwardly curving sides on a horizontal plane, the normal action of the undertow is avoided; and solids carried by the water are deposited (within the recesses) as the body of water momentarily comes to rest and waves do not break over the structure. This process of depositing solids from the water prevents scouring around the base of the bulkhead and the solids deposited assist in building out the beach.

When the recesses have partly filled up and it is desired to build the shore out further into the water, then I propose to construct new bulkhead points out beyond the original apices of the recesses. Then the process by nature repeats itself by filling the new recesses and so rehabilitates the shore line and carries the shore line out.

I have found that the preferred proportions of the parts of a structure made in accordance with my invention depend largely upon local conditions. There can be no fixed relation between the height of the structure, the gradation of the curved sides and the depth of the recesses. Where a stretch of beach is subjected more or less constantly to high seas, the recesses will have to be relatively deep and the structure itself relatively large. For the most part I have found that it is feasible to take existing bulkheads or sea walls and add recesses to the face of same.

Again, the curvature on the horizontal plane of the sides of the recesses depends largely on local conditions. I find the parabolic curve is probably the most satisfactory because it permits a gradual deflection as the wave or current action enters the recess; the deflection being increased as the wave moves inwardly into the recess. Semi-circular or elliptical curved recesses are satisfactory where moderate forces act upon the structure. Other forms of curvature can also be used.

There are a number of ways in which bulkheads can be constructed in accordance with my invention. In the first place, the bulkhead can be formed as units having recesses of the required configuration. A second type of bulkhead or sea wall can be made by fitting together separate parts and anchoring them to piles or the like. For example, the sea wall and the recesses can be manufactured in separate units and assembled later at the site. A third type of bulkhead consists in driving wood or metal sheet piling into the ground with or without solid backing and bracing. This type of structure is most economical and very satisfactory. One of the advantages of this type of construction is that the sheet piling can be easily removed and used over again.

All of the above is directed to shore conditions and the action of waves and water currents.

My invention can also be used to prevent the destructive action of the wind in producing dust storms and to prevent drifting sands.

Other objects and advantages of this invention will be apparent from the following description taken in conjunction with the accompanying drawing, in which Fig. 1 is a top plan of a sea wall or bulkhead, in which parabolic curves are used to form the recesses. The center portion of the drawing shows the curved sea walls when first erected in place and when the direction of the currents is at right angles to the shore line. Said currents are indicated by arrows. The right-hand recesses on this drawing show how the solid material is deposited by the currents at points adjacent to the original shore line. The drawing also shows the apex of the curved side on the extreme right and how the apex of the curves can be built outwardly at such times as the parabolic curved recesses have been partially filled and it is desired to still further advance the shore front.

Fig. 2 is a top diagrammatical plan drawing showing arrangement of parabolical recesses when the resultant current or wave action is at another angle than at right angles to the shore line.

Fig. 3 is a top diagrammatical plan drawing showing arrangement of semi-circular recesses when the direction of the currents is at right angles to the shore line.

Fig. 4 is a top isometric drawing of an assembled unit which can be used to construct sea walls or bulkheads in accordance with my invention.

In Figs. 1, 2, and 3, the shore line is represented by the line A—B.

Fig. 1 shows a parabolic curve construction, the curve being represented by 2—4—6, also 6—8—10, also 10—12—14, in which the apices of the curved sides of the parabolas are represented by 2—6—10—14 respectively.

Fig. 1 represents the construction when the current or wave action is at right angles to the shore A—B; in other words, 2—6—10—14 representing the apices are on a line, which line is parallel to the shore line A—B.

In Fig. 1, I have shown filling 16 placed behind the parabolic curves 4—6—8—10—12. I have also shown bracing to support the curved part of the structure. In the recesses represented by 6—8—10, I have shown the wave or current action as indicated by arrows. When the currents enter the recesses, those currents which come in contact with the apices 6—10 will be gradually led off and directed by the face of the curve including the immediate currents adjacent to the currents actually coming in contact with the curved surfaces, so that these currents will meet head-on at 8, thus spending their impact one against the other. In addition to this, the water at 8 will act as a cushion to take the impact of the current or wave action coming in the center of the recess and at right angles to the shore. The increased velocity of the currents coming in contact with the curved surface will cause the same to meet head-on prior to the arrival of the currents coming in a direct line at right angles to the shore. The result of this action will cause the water to come to rest and in so doing, it will deposit the solid matter carried by it, thus filling up the recess opposite 8. In addition, the wave and current action of the recess will prevent not only the direct impact against the shore line, but it will prevent the waves breaking and going over the shore line at a right angle.

The arrangement which I have described will also prevent the scouring action of the undertow which tends to undermine any sea wall or bulkhead built at 8 when curved surfaces are not used. Still further, in preventing the breaking of the waves over 8, I also prevent the scouring action of the water which always takes place behind the sea wall when the waves break over the same.

In Fig. 1, recesses 10—12—14, I have indicated how the solid material carried by the water is deposited in accordance with my invention. At the extreme right of Fig. 1, I have shown this same effect when the deposited material is carried out into the recess still further from the shore line, as at 22.

At the extreme right of Fig. 1, I have shown in dotted lines, see 14, an arrangement by which the point of the curved surfaces can be moved out further from the shore line, when the deposited material 22 has accumulated to such an extent that it is desired to build out the shore line still further.

In Fig. 2, I have again used parabolic curves for the recesses. When there is a combination of wave and current actions, as for instance, where the wave action is at right angles to the shore line A—B and where there is a current action not at right angles to said shore line, I have illustrated arrow C as representing the direction of the wave action, arrow D as representing the direction of the current action, then the resultant action will be represented by, say, arrow E. In such cases, I propose to have a line drawn through the apices of the parabolic curves, namely, line 2—6—10—14 at right angles to the arrow line E and the ends of the parabolic curve will rest on line 2—6—10—14. In that case, the axis of curvature of the sides of each recess will lie parallel to the direction of the forces acting against the structure. If these forces act in different directions, then the axis of curvature of the sides of the recesses will lie parallel to the resultant of these forces.

In some cases, it may be advisable, where the wave action and the current action are at different angles, to allow the line 2—6—10—14 to be parallel with the shore line A—B. In this case, instead of using parabolic curves, I propose to use irregular curves, which I have not attempted to show in the drawing.

Fig. 3 is similar to Fig. 1, except that the curves 6—8—10 and 10—12—14 are semi-circular curves and not parabolic curves. It is also possible to use elliptical or any other curved surfaces which are not parabolic or semi-circular.

Fig. 4 shows a unit 24—26—28—30 and 32 which can be constructed as a unit either built on shore and launched out or built at some other point and floated to the site, and in both cases then, the unit is firmly secured to the bottom and the shore. Said unit can have any suitable bracing not shown on the drawing and can have proper material used for filling, indicated partly by 34.

The drawing herein illustrates some embodiments of this invention, but it is to be understood that it is for illustrative purposes only and various changes in the form may be made within the scope of the appended claims without departing from the spirit of the invention.

I claim:

1. A sea wall consisting of basin-like structures arranged in a continuous series along a shore front at the water's edge, each of said basin-like structures having a plurality of vertical walls and a floor integral with said walls to form a floatable unit and adapted to receive material to weight the structure in position at the water's edge, at least two of said vertical walls being curved inwardly on the horizontal plane so that each basin-like structure, when placed along similar adjoining basin-like structures forms a sea wall in which all the vertical walls facing the water are curved inwardly on a horizontal plane, said sea wall comprising a series of alternate recesses formed by said vertical inwardly curved walls, each recess being separated from adjoining recesses by sharp, pointed apices on the horizontal plane and formed by the outwardly projecting side walls of each recess, said series of basin-like structures being so placed along the water's edge that a body of water moving against said structure is directed into the recesses at all points along vertical walls curved inwardly on a horizontal plane.

2. A sea wall as claimed in claim 1 in which each recess has an axis of curvature lying parallel in the prevailing direction in which the sand and water act against the shore front.

FOSTER MILLIKEN.